United States Patent
Guleryuz et al.

(10) Patent No.: US 8,000,539 B2
(45) Date of Patent: Aug. 16, 2011

(54) GEOMETRICAL IMAGE REPRESENTATION AND COMPRESSION

(75) Inventors: Onur G. Guleryuz, Sunnyvale, CA (US); Arthur L. Cunha, Westborough, MA (US)

(73) Assignee: NTT DoCoMo, Inc., Tokyo (JP)

( * ) Notice: Subject to any disclaimer, the term of this patent is extended or adjusted under 35 U.S.C. 154(b) by 1222 days.

(21) Appl. No.: 11/643,925

(22) Filed: Dec. 20, 2006

(65) Prior Publication Data

US 2007/0160303 A1 Jul. 12, 2007

Related U.S. Application Data

(60) Provisional application No. 60/752,809, filed on Dec. 21, 2005.

(51) Int. Cl.
*G06K 9/36* (2006.01)
*H04B 1/66* (2006.01)
(52) U.S. Cl. .............. 382/232; 375/240; 348/384.1
(58) Field of Classification Search .............. 382/173, 382/181, 232–254; 348/384.1–440.1; 375/240–241
See application file for complete search history.

(56) References Cited

U.S. PATENT DOCUMENTS

| | | | |
|---|---|---|---|
| 5,500,904 A * | 3/1996 | Markandey et al. | 382/103 |
| 5,870,502 A * | 2/1999 | Bonneau et al. | 382/249 |
| 7,418,144 B2 * | 8/2008 | Wang et al. | 382/240 |
| 2005/0105817 A1 | 5/2005 | Guleryuz | |

FOREIGN PATENT DOCUMENTS

| | | |
|---|---|---|
| EP | 1 496 702 | 1/2005 |
| WO | WO 00/03347 | 1/2000 |

OTHER PUBLICATIONS

Pennec et al., IEEE Publication, 2003, "Geometrical Image Compression with Bandelets" (pp. 1273-1286).*
PCT International Search Report for PCT Appln. No. PCT/US2006/049152, mailed Oct. 10, 2007, 7 Pages.
PCT Written Opinion for PCT/US2006/049152, mailed Oct. 10, 2007, 10 Pages.
Peyre et al., "Discrete Bandelets With Geometric Orthogonal Filters", 2005 International Conference on Image Processing, Genova, Italy, vol. 1, XP002448146, ISBN: 0-7803-9134-9, pp. 65-68.
Peyre et al., "Surface Compression With Geometric Bandelets", ACM Transactions on Graphics ACM USA, vol. 24, No. 3, Jul. 2005, pp. 601-608, XP002448147, ISSN: 0730-0301.
Campbell et al., "A Geometric Flow for White Matter Fibre Tract Reconstruction", Biomedical Imaging, 2002, Proceedings, 2002 IEEE International Symposium on Jul. 7-10, 2002, Piscataway, NJ, USA, IEEE Jul. 7, 2002, pp. 505-508, XP010600636, ISBN: 0-7803-7584-X.

(Continued)

*Primary Examiner* — Manav Seth
(74) *Attorney, Agent, or Firm* — Blakely, Sokoloff, Taylor & Zafman LLP

(57) ABSTRACT

A method and apparatus is disclosed herein for geometrical image representation and/or compression. In one embodiment, the method comprises creating a representation for image data that includes determining a geometric flow for image data and performing an image processing operation on data in the representation using the geometric flow.

20 Claims, 11 Drawing Sheets

○ ORIGINAL WAVELET COEFFICIENT
○ AUGMENTED WAVELET COEFFICIENT

OTHER PUBLICATIONS

Saevarsson et al., "Translation Invariant Combined Denoising Algorithm", Circuits and Systems, 2005, ISCAS 2005, IEEE International Symposium on Kobe, Japan May 23-26, 2005, Piscataway, NJ, USA, IEEE, May 23, 2005, pp. 4241-4244, XP010816609, ISBN: 0-7803-8834-8.

Guleryuz et al., "Image Compression With a Geometrical Entropy Coder", 2006 International Conference on Image Processing, Atlanta, GA, USA, Oct. 8-11, 2006, pp. 1161-1164, XP002448148, IEEE Piscataway, NJ, USA, ISBN: 1-4244-0481-9.

Algazi et al., "Perceptually Transparent Coding of Still Images", IEICE Transactions on Communications, Communications Society, Tokyo, Japan, vol. E75-B, No. 5, May 1, 1992, pp. 340-348, XP000307374, ISSN: 0916-8516.

Chen et al., "Oversampled Wavelet Motion Compensation and its Hierarchical Block-Matching Algorithm", Neural Networks and Signal Processing, 2003, Proceedings of the 2003 International Conference on Nanjing, China, Dec. 14-17, 2003, Piscataway, NJ, USA, IEEE vol. 2, Dec. 14-17, 2003, XP010691745, ISBN: 0-7803-7702-8, pp. 1270-1273.

H. Guo, "Theory and Applications of the Shift-Invariant, Time-Varying and Undecimated Wavelet Transforms", M. SC. Thesis, Rice University, May 1995, pp. I-XV-1-122, XP002448149, Houston, TX, USA, http://citeseer.ist.psu.edu/guo95theory.html, pp. 92-111, paragraph 5.1-paragraph 6.6.

'Gersho, et al. "Vector Quantization and Signal Compression." Klumer Academic Publishers, 1991. pp. 307-406.

Vetterli, et al. "Wavelets and Subband Coding." Prentice Hall, Signal Processing Series. Englewood Cliffs, NJ. 1995. Chapter 7.

Said, et al. "A new, fast, and efficient image codec based on set partitioning in hieracrchical trees.", IEEE Transactions on Circuits and Systems for Video Tech., pp. 243-250. Jun. 1996.

Christopoulos, et al. "The JPEG2000 still image coding system: An overview". IEEE Transactions on Consumer Electronics. vol. 46, No. 4, pp. 1103-1127. Nov. 2000.

Kingsbury, "A Dual-tree Complex Wavelent Transform with Improved Orthogonality and Symmetry Properties", in Proceedings of IEEE Conference on Image Processing, Sep. 2000.

Donoho, et al "Data Compression and Harmonic Analysis", IEEE Transactions on Information Theory. Oct. 1998.

Cohen, et al "On the Importance of Combining Wavelet-Based Nonlinear Approximation with Coding Strategies." IEEE Transactions on Information Theory, Jul. 2002.

Guleryuz, "Predicting Wavelet Coefficients Over Edges Using Estimates Based on Nonlinear Approximants". Data Compression Conference. IEEE. Apr. 2004.

Starck, et al "The Curvelet Transform for Image Denoising". IEEE Transactions on Image Processing. Jun. 2002.

Le Pennec, et al "Sparse Geometric Image Representations with Bandelets". IEEE Transactions on Image Processing. Apr. 2005.

Guleryuz, Nonlinear Approximation Based Image Recovery Using Adaptive Sparse Reconstructions and Iterated Denoising—Part I—Theory, IEEE Trans. on Image Processing. Mar. 2006.

Guleryuz, Nonlinear Approximation Based Image Recovery Using Adaptive Sparse Reconstructions and Iterated Denoising—Part II—Adaptive Algorithms, IEEE Trans. on Image Processing. Mar. 2006.

Joint Video Team of ITU-T and ISO/IEC JTC 1, Draft ITU T Recommendation and Final Draft Internation Standard of Joint Video Specification. Mar. 2003.

* cited by examiner

GEOMETRICAL IMAGE REPRESENTATION AND COMPRESSION

PRIORITY

The present patent application claims priority to and incorporates by reference the corresponding provisional patent application Ser. No. 60/752,809, titled, "Geometrical Image Representation and Compression," filed on Dec. 21, 2005.

FIELD OF THE INVENTION

The present invention relates to the field of image processing; more particularly, the present invention relates to creating a geometrical image representation of image data and performing image processing operation using the new representation

BACKGROUND OF THE INVENTION

Compact image representation is a well-known problem. Typical techniques proposed over the years include non-linear techniques like vector quantization where an image is represented by its index in a vector dictionary, and linear representations (e.g., wavelet transform based representations, Fourier transform based representations, Discrete Cosine Transform (DCT) based representations, etc., where an image is linearly transformed and represented in terms of its linear transform coefficients. Linear representations are often times augmented with simple non-linear processing in order to further extend their effectiveness.

One of the most important properties of compact representations is their ability to approximate an image using few parameters. The approximation rate of a representation can be obtained as the reduction of representation error as more parameters are used in the representation. For example, this rate can be obtained by calculating the reduction of the mean squared error between the original image and its approximation using the given representation as more parameters are added to the representation. With some exceptions, representations with a high approximation rate (smaller error with a given number of parameters) are expected to yield better performance in compression, denoising, and various other applications.

Solutions for linear representations achieving an optimal or near optimal approximation rate for one dimensional (1-D) signals containing isolated singularities are known. For example, it is known that linear transforms based on compact wavelets with vanishing moments can achieve near optimal approximation rates. However, straightforward generalizations of these representations to two dimensions (e.g., two dimensional (2-D) wavelet transforms) for use with two dimensional images are known to be suboptimal. For purposes herein, these straightforward generalizations are referred to as first generation linear representations.

There are many first generation linear representations and compression algorithms based on first generation linear representations. However, these solutions are known to be suboptimal on images and video that manifest singularities along curves. That is, first generation representations and techniques based on them result in too many coefficients or parameters around singularities. While some compression techniques are very good at encoding coefficients, they result in suboptimal performance since the first generation representations they use produce too many coefficients to encode.

In two dimensional images, singularities are along curves whereas the first generation representations can only handle point singularities and are exponentially suboptimal in two dimensions. FIGS. 1A-C illustrates the use of compact wavelets for signals of various dimensions. Referring to FIG. 1A, compact wavelets are shown leading to near optimality for 1-D signals, and FIG. 1B illustrates compact wavelets leading to near optimality for 2-D signals with point singularities. However, as indicated in FIG. 1C, compact wavelets are suboptimal for 2-D signals with singularities over curves. That is, the signal in FIG. 1C manifests a singularity along a curve and over such signals, the two dimensional wavelet transform does not produce near optimal approximation rates. Interestingly, current state-of-the-art image compression techniques are based on these first generation representations. Hence, it is well-known in the research community that current state-of-the-art image compression techniques are suboptimal.

Recently, second generation representations that are aimed at improving the suboptimality of the first generation representations have been introduced. These techniques are typically designed using idealized mathematical models of images defined over continuous domains. Digital images, on the other hand, are defined on a discrete grid and fail to satisfy many of the core assumptions of these methods. Hence, these techniques currently cannot go beyond state-of-the-art first generation techniques even though they should be exponentially better than first generation techniques.

Some of the best second generation representations, such as complex wavelets, are expansive/overcomplete, meaning they result in more parameters than image pixels. While many of these extra parameters are small, compression techniques that effectively (in a rate-distortion sense) take advantage of compaction in such an expansive domain are yet to be developed.

Other representations more in tune with the properties of digital images and compression algorithms based on these representations exist. However, their performance over first generation techniques is still lacking.

Some compression algorithms also try to improve performance around singularities by using directional prediction (see, for example, the INTRA frame coding method used in Joint Video Team of ITU-T and ISO/IEC JTC 1, "Draft ITU T Recommendation and Final Draft International Standard of Joint Video Specification (ITU-T Rec. H264 | ISO/IEC 14496-10 AVC)," Joint Video Team (JVT) of ISO/IEC MPEG and ITU-T VCEG, JVT-G050, March 2003). Such solutions are only applicable over piecewise smooth image models with linear or line-like singularities. Furthermore, as they try to predict large regions using a limited class of predictors, pixels away from the boundary of available data are predicted incorrectly. Similarly, when singularities are along curves rather than just line-like or when image statistics are not locally smooth, these methods fail.

Methods that generalize directional predictors by deploying transforms over directional lines are also limited to line-like singularities. Furthermore, they need to design their compression algorithms over blocks of varying sizes, which results in inefficiencies when the resulting coefficients are encoded with entropy coders.

SUMMARY OF THE INVENTION

A method and apparatus is disclosed herein for geometrical image representation and/or compression. In one embodiment, the method comprises creating a representation for image data that includes determining a geometric flow for image data and performing an image processing operation on data in the representation using the geometric flow.

DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
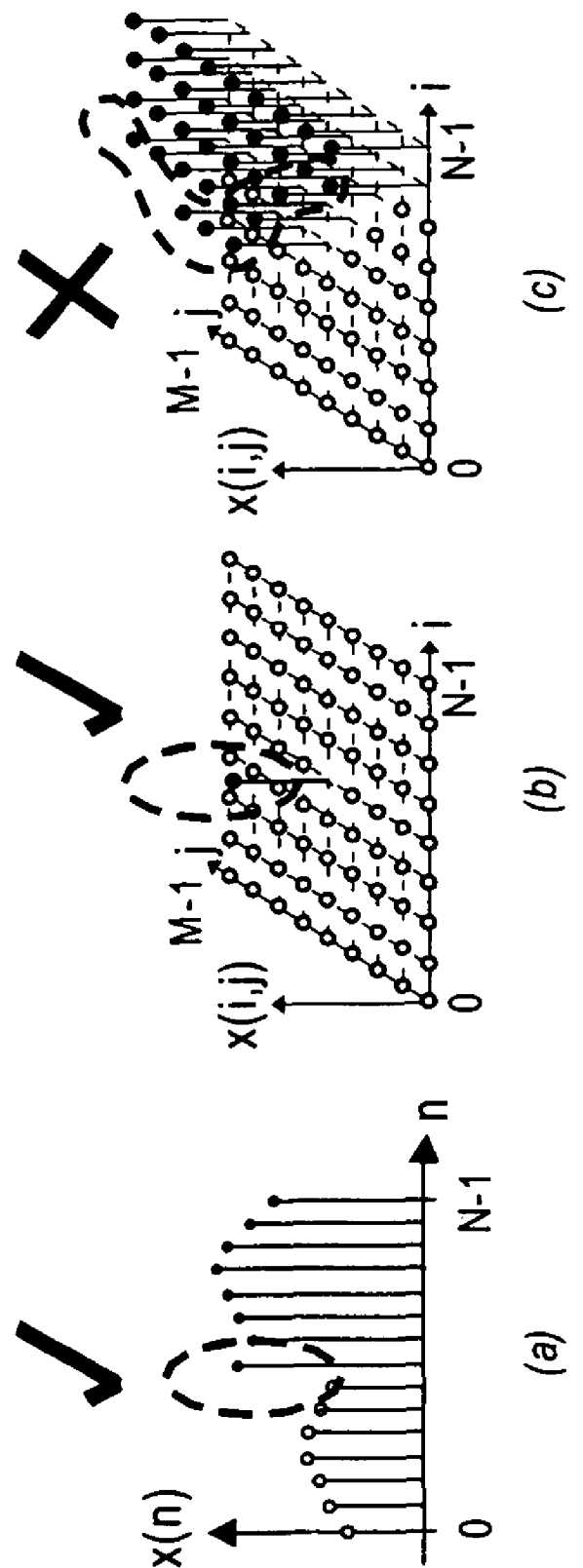
FIGS. 1A-C illustrates the use of compact wavelets for signals of various dimensions.

A new image representation that allows capture of image singularities (edges and other features that manifest themselves along curves) is disclosed. In one embodiment, an image-adaptive geometrical flow field that helps characterize the inherent geometrical singularity structure in an image is computed, and, subsequently, image pixels are specified conditioned on the computed flow. This conditional specification allows for a very compact capture of image pixels so that the number of parameters required to represent the image is greatly reduced.

In one embodiment, the procedure for generating the geometrical flow plus conditional pixel specification is performed in the transform domain where it becomes "geometrical flow plus conditional transform coefficient specification". The latter approach allows the proposed geometrical flow-based representation to benefit domains that are suited to particular applications.

The image representation can be used in various image processing applications including, for example, image compression and denoising in order to improve the performance of these applications.

In one embodiment, the image representation is generalized to dimensions higher than two to efficiently capture singularities over surfaces.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quanties. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Figure 2:
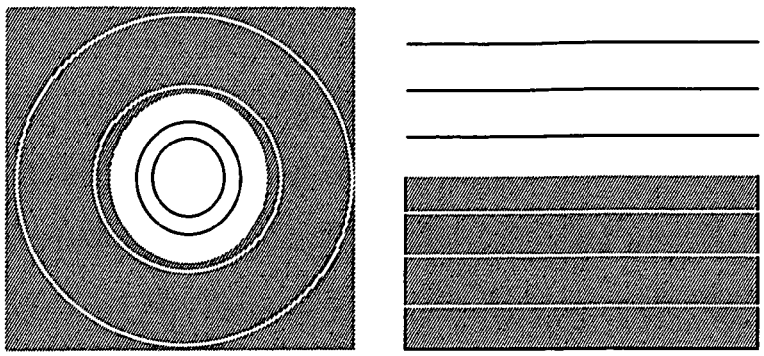
FIG. 2 illustrates two simple images, the corresponding functions, and possible geometrical flows.
Figure 2:
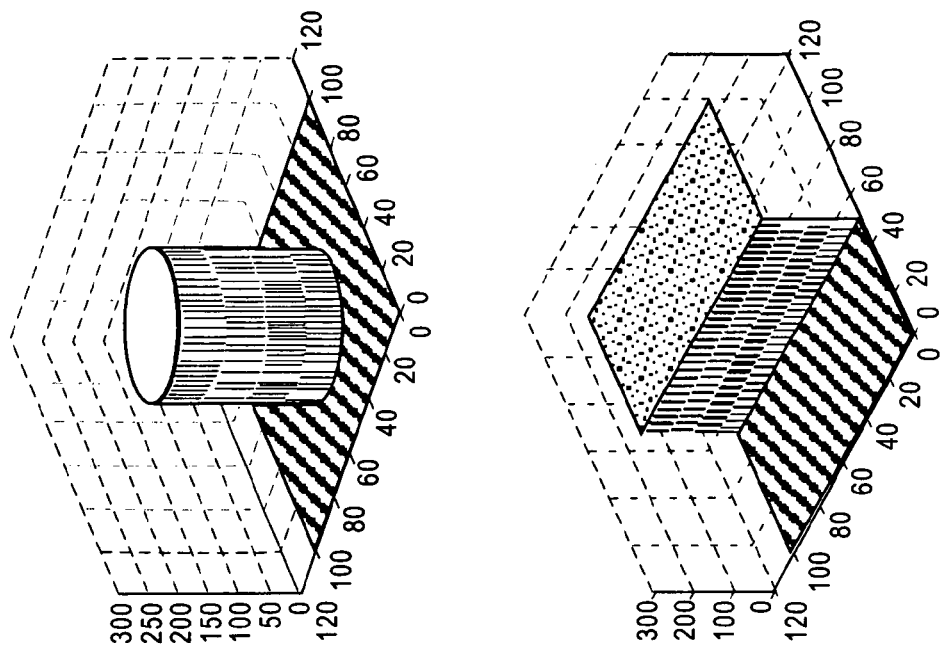
Figure 2:
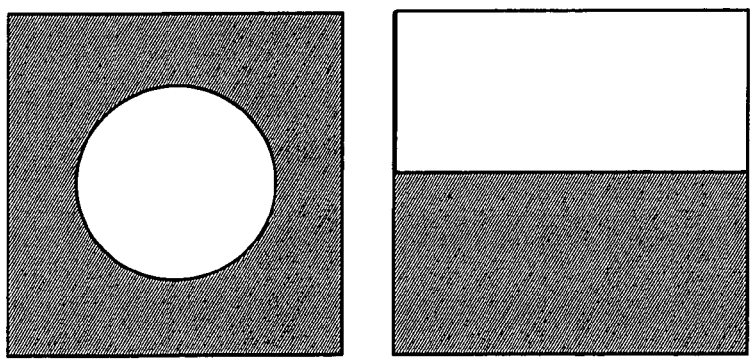

Geometrical flow fields may be thought of as fields defined over piecewise uniform functions with discontinuities along curves. Over piecewise smooth functions, a geometrical flow field delineates curves along which the function is regular, i.e., two points connected by a geometrical flow curve do not have a singularity between them along the curve. FIG. 2 shows two simple images, the corresponding functions, and possible geometrical flows. Pixels along each flow do not have singularities separating them along the flow. Over piecewise uniform functions, this definition can be extended to use the predictability of the function or the approximation rate of the function.

For a given image, there may be many flows. In one embodiment, a technique disclosed herein chooses the flow optimally for the intended application. In a compression application, the flow that results in the most compact representation in a rate-distortion sense is selected.

Figure 3:
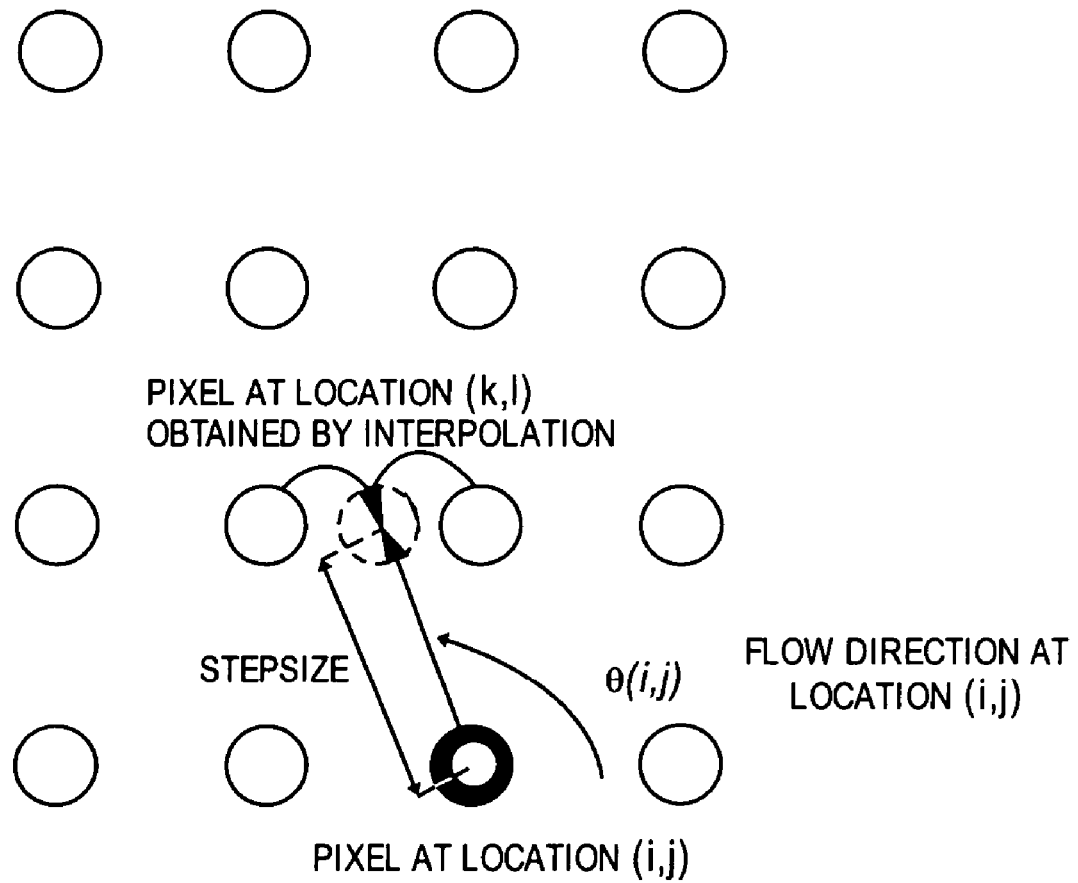
FIG. 3 illustrates obtaining a location for a given direction angle.

In one embodiment, for a given image, a flow field that identifies a direction angle $\theta(i,j)$ for the pixel $(i,j)$ is generated. The direction angle $\theta(i,j)$ is such that the pixel at $(i,j)$ and the pixel at $(k,l)$ obtained by stepping in the direction $\theta(i,j)$ from $(i,j)$ are on the same flow. FIG. 3 illustrates a way in which the location $(k,l)$ can be obtained for a given $\theta(i,j)$. As the technique is designed for images defined on a discrete grid, one can utilize various interpolation techniques and step sizes to determine the pixel value at $(k,l)$. In other words, if stepping in the direction $\theta(i,j)$ from $(i,j)$ does not result in an integer location (i.e., results in non-integer locations), then suitable interpolation techniques can be used to determine the pixel value for the pixel at $(k,l)$.

For the pixel at $(i,j)$, a pixel neighborhood $\eta(i,j)$ containing a set of pixels along the flow passing through $(i,j)$ is determined. For example, this neighborhood can be determined based on $\theta(i,j)$ by stepping in the direction of $\theta(i,j)$ to arrive at $(k,l)$ and continuing with the stepping using $\theta(k,l)$ and so on, until a predetermined number of steps are taken. Again, suitable interpolation methods can be used to determine directions and locations whenever non-integer locations are reached or directions are ambiguous. In one embodiment, the neighborhood is extended bidirectionally by stepping in the direction $\theta(i,j)+\pi$ and so forth, where $\theta(i,j)+\pi$ corresponds to locally linear flow. Other bidirectional extension conventions based on various flow smoothness conventions and assumptions, such as locally quadratic, locally cubic, etc., can be employed.

In a prediction application, the pixel at $(i,j)$ is predicted based on the pixel values in the pixel neighborhood $\eta(i,j)$. Repeating the operation for all pixels in the image, a prediction error image is computed. Subsequent operations like compression are performed using the prediction error image.

In a denoising application, the pixel value at $(i,j)$ is denoised based on the pixel values in the pixel neighborhood $\eta(i,j)$. Repeating the operation for all pixels in the image, a denoised image is computed.

In a steerable transform application, the image is partitioned into possibly overlapping regions, and a steerable or directional transform is evaluated over each region, where the steering/direction parameters of the transform are adjusted based on the calculated flow parameters of the pixels in the region. Subsequent operations such as, but not limited to, compression or denoising are performed on the resulting transform coefficients.

In an overcomplete transform application, a directional overcomplete transform such as, for example, curvelets and complex wavelets, is evaluated over the image. The flow parameters are used to specify which of the overcomplete coefficients are relevant for the image. These specified coefficients are then used in subsequent operations such as, but not limited to, compression or denoising.

In an alternative embodiment, an image containing an augmented set of pixel values is created. The augmented set of pixel values may be created by using suitable interpolation techniques. One or more of the flow calculation, the neighborhood calculation, region determination and steerable transform determination are performed on this augmented image to facilitate prediction, denoising, compression, overcomplete transform coefficient specification, etc., of the original image.

In one embodiment, the above operations are performed in the transform domain on images formed by groups of transform coefficients by first calculating a given transform of the image and repeating the above outlined operations on the images formed by the transform coefficients.

Over higher dimensional images/functions, such as, for example, three dimensional images/functions (e.g., video sequences, volumes depicted by magnetic resonance slices, etc.), the geometric flow delineates higher dimensional surfaces such that two pixels on a given flow surface do not have any singularities separating them on the surface. The above operations are then performed along these surfaces.

In one embodiment, the geometric flow is optimized by considering flows over certain classes of smoothness spaces. In one embodiment, the segmentation of the flow using a quadtree is obtained, with each leaf of the quadtree having a parameter that specifies the flow in the segment corresponding to that leaf, where the parameter denotes the smoothness of the flow within the segment. For example, in one embodiment, the parameter denotes a first order polynomial flow, a second order polynomial flow, a third order polynomial flow, etc., within the segment. The optimal quadtree segmentation and the optimal parameter within each segment can be determined to optimize rate-distortion performance in a compression application or denoising performance in a denoising application.

More Detailed Specifics Regarding Various Embodiments

In one embodiment, a two-dimensional wavelet transform is applied over the image. Transform coefficients in the subbands of this transform form images on which flow based computations are performed.

Figure 4:
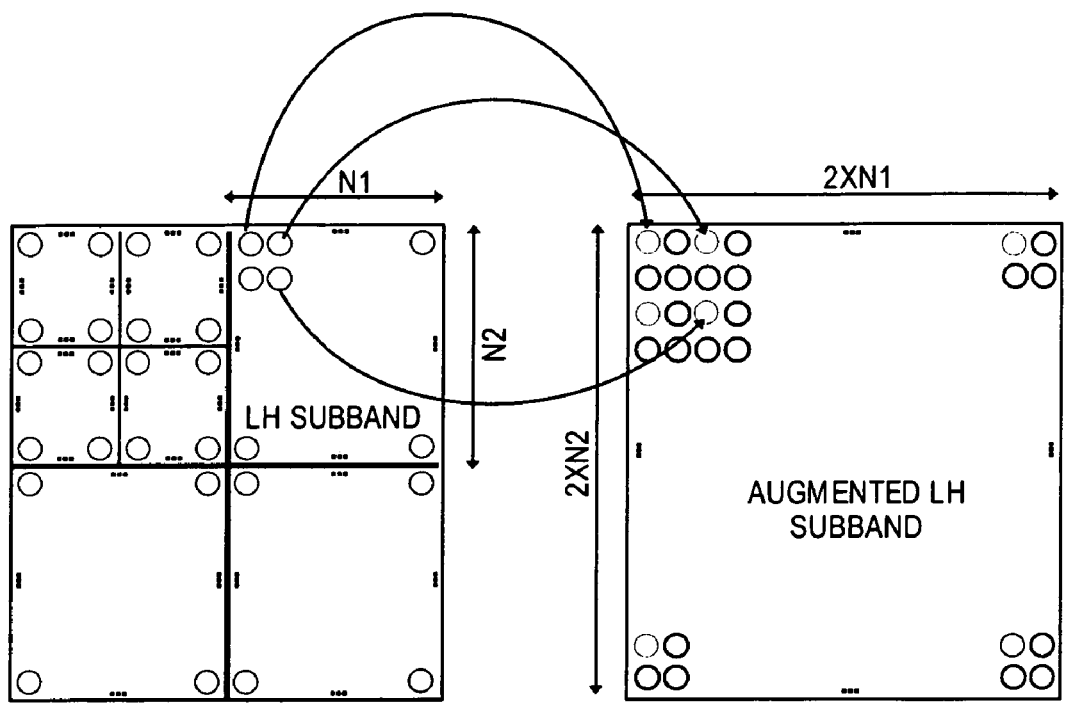
FIG. 4 is a block diagram illustrating the formation of the augmented subband based on original coefficients and augmented coefficients

As each subband of the wavelet transform is formed by decimation, augmented subbands are first calculated where each subband is upsampled by two in each direction, i.e., undecimated wavelet transform coefficients are calculated. The undecimated/upsampled coefficients include the original coefficients placed at even sample locations (i mod 2=0 AND j mod 2=0) and new coefficients at the remaining sample locations (i mod 2≠0 OR j mod 2≠0). FIG. 4 is a block diagram illustrating the formation of the augmented subband based on original coefficients and augmented coefficients. Referring FIG. 4, the LH subband is unsampled into an augmented LH subband. For purposes herein, the new coefficients obtained after the upsampling process, as opposed to the original coefficients, are referred to as the augmented coefficients.

Figure 5:
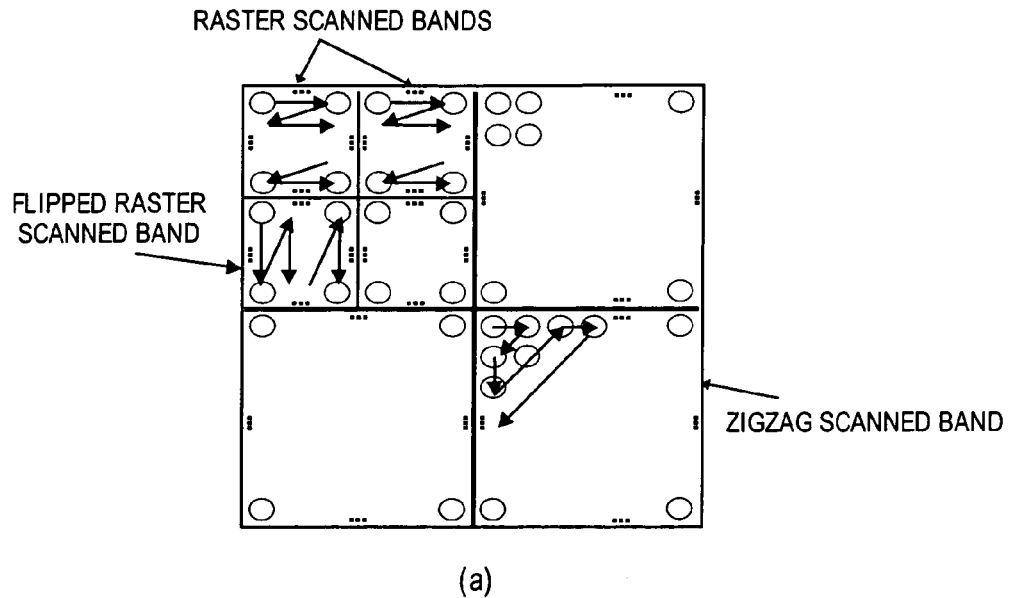
FIGS. 5A and 5B illustrates various example scans of original coefficients
Figure 5:
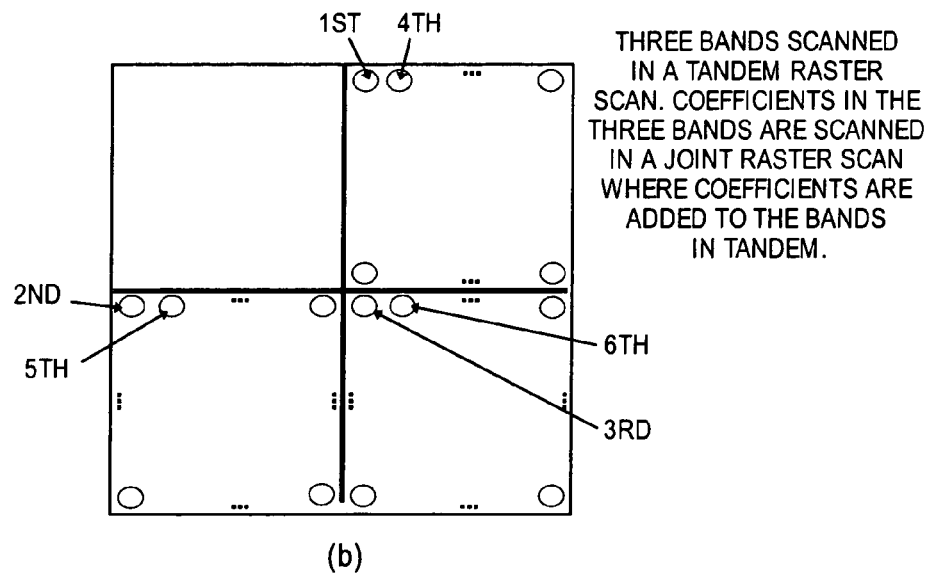

In one embodiment, original coefficients are processed with the help of the augmented data (e.g., the augmented coefficients). In one embodiment, original coefficients are processed one at a time by adding them to a set of available original coefficients one at a time. After adding each coefficient to the available set, a sequence of operations are performed using the coefficients in the available set. In one embodiment, by starting with an image having all wavelet transform coefficients set to zero, one original coefficient is added at a time to the set of available original coefficients. In concert, a sequence of pixel domain images are built where each image is formed by inverse transforming only the currently available original coefficients with the rest of the original coefficients set to zero. The original coefficients are added to the available set, for example, in a raster scan inside each subband. FIGS. 5A and 5B show various example scans of original coefficients. In each scan, original coefficients are added to the available coefficient set in a particular order determined by the scan. In FIG. 5A, the 2LL and 2LH subbands are raster scanned, the 2HL band is flipped raster scanned, and the 1HH band is zigzag scanned. In FIG. 5B, three bands are tandem scanned. The coefficients in the three bands are scanned in a joint raster scan where coefficients are added to the bands in tandem. The constructed sequence of pixel domain images are referred to herein as approximation images.

In one embodiment, in a given subband, prior to adding the original coefficient at location (p,q), the augmented coefficient estimates of this subband are calculated by applying a shifted wavelet transform to the current approximation image, i.e., the approximation image obtained by inverse transforming all original coefficients previous to (p,q), but not the original coefficient at (p,q) with all the remaining original coefficients set to zero. In one embodiment, the shifted wavelet transform is the transform that would have yielded the actual augmented coefficients had the current approximation image been a perfect approximation. Hence, the estimates of augmented coefficients become progressively more accurate as more original coefficients are added to the subbands and better approximation images are constructed.

As each original coefficient is added, another approximation image is computed. Using the approximation image, augmented coefficients and the augmented subband is estimated. Other more sophisticated interpolation and data recovery methods can also be used to generate augmented coefficients. These include Onur G. Guleryuz, "Nonlinear Approximation Based Image Recovery Using Adaptive Sparse Reconstructions and Iterated Denoising: Part I—Theory," IEEE Transactions on Image Processing; Onur G. Guleryuz, "Nonlinear Approximation Based Image Recovery Using Adaptive Sparse Reconstructions and Iterated Denoising: Part II—Adaptive Algorithms," IEEE Transactions on Image Processing; and Onur G. Guleryuz, "Predicting Wavelet Coefficients Over Edges Using Estimates Based on Nonlinear Approximations," Proc. Data Compression Conference, IEEE DCC-04, Apr. 2004.

Figure 6:
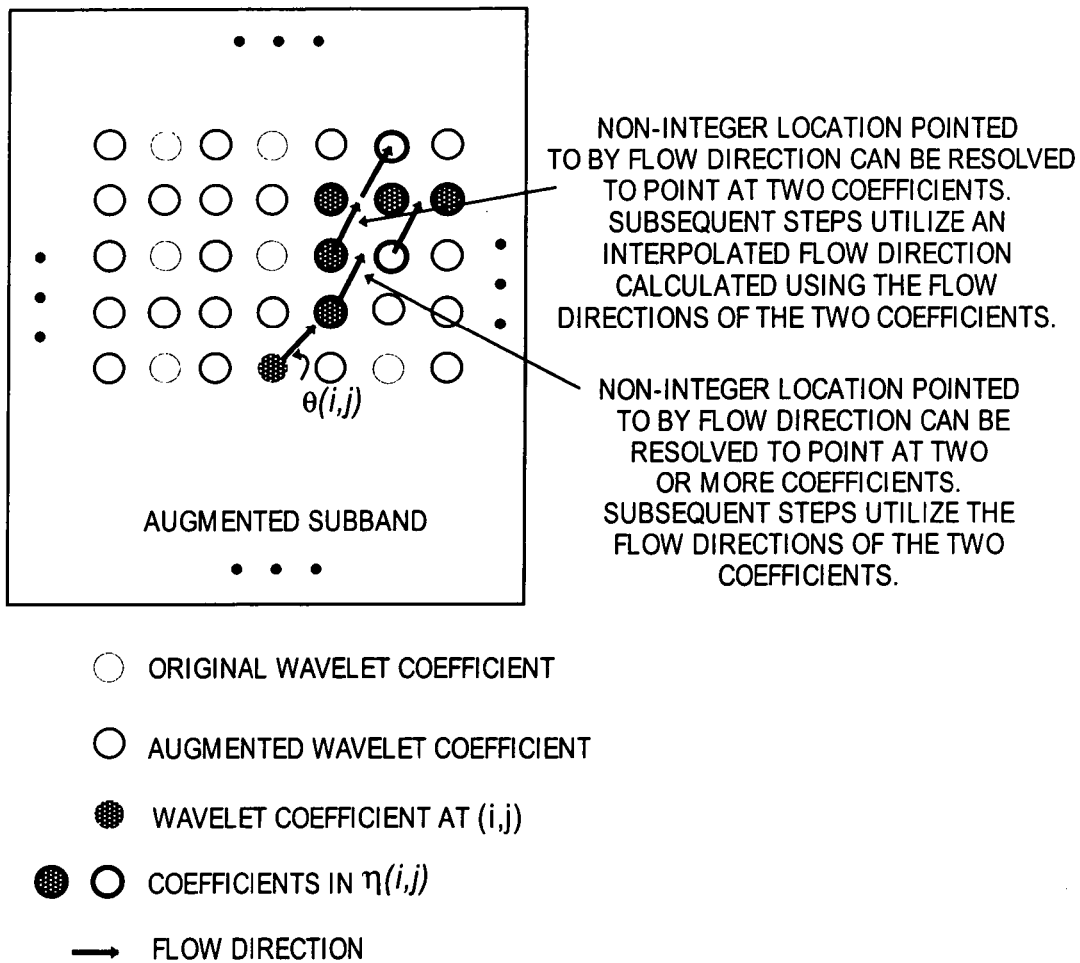
FIG. 6 illustrates formation of an example prediction neighborhood.

For the original coefficient at location (p,q) in the given subband and at location (i=2p,j=2q) in the augmented subband, a flow direction $\theta(i,j)$ is obtained and the neighborhood $\eta(i,j)$ containing a set of coefficients is constructed. This neighborhood is constructed in the augmented subband and includes some of the currently available original coefficients and some of the currently estimated augmented coefficients. FIG. 6 illustrates formation of an example prediction neighborhood at location (i=2p,j=2q). If the flow direction points to a non-integer location, the flows at pixels located at integer positions around the non-integer location can be used to propagate the neighborhood formation. Furthermore, in one embodiment, if the flow direction points to a non-integer location, the flows at pixels located at integer positions around the non-integer location are interpolated to propagate the neighborhood formation.

Prediction and Compression Applications

The geometrical image representation may be used in the prediction and compression applications. Note that the process can be generalized to other applications, steerable transforms, etc.

For prediction, the objective is to make a prediction as to the original coefficient at (i=2p,j=2q) and calculate the prediction error. Thus, prediction error coefficients are formed at the original sample points. These prediction error coefficients are subsequently compressed in place of the original coefficients. The flow direction $\theta(i,j)$ for each original coefficient is transmitted as well as the prediction errors in a causal fashion so that the decoder performing the decompression can reconstruct the original coefficients, apply an inverse wavelet transform on the reconstructed original coefficients, and reconstruct the image. Note that, in one embodiment, operations are performed in a causal way so that a coefficient in the first is predicted using coefficients transmitted prior to that coefficient and augmented coefficients constructed using the coefficients transmitted prior to that coefficient.

Figure 7:
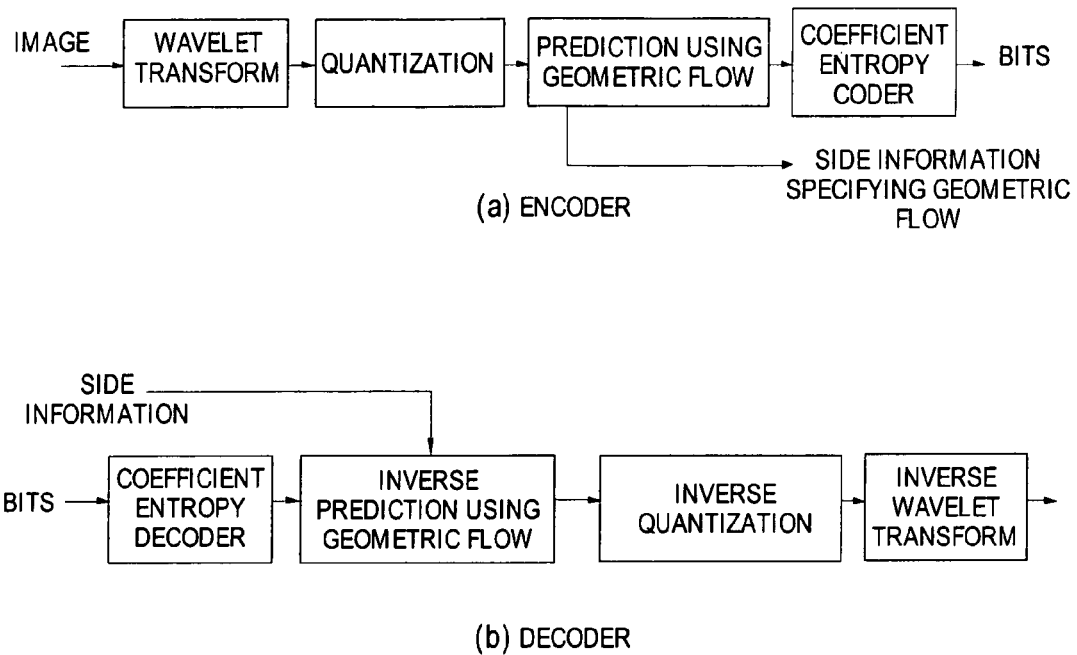
FIG. 7 is a block diagram of one embodiment of an encoder that is part of a on-based image compression system using geometric flow.

FIG. 7A is a block diagram of one embodiment of an encoder that is part of a prediction-based image compression system using geometric flow. The blocks in FIG. 7A are performed by processing logic that may comprise hardware (circuitry, dedicated logic, etc.), software (such as is run on a general purpose computer system or a dedicated machine), or a combination of both.

Referring to FIG. 7A, wavelet transform 702 applies a wavelet transform to image data 701. Quantization unit 703 performs quantization on the wavelet coefficients generated by wavelet transform 702 to create quantized coefficients. Prediction unit 704 generates a prediction for each of the quantized coefficients, compares the prediction to the actual quantized coefficient values, and produces prediction error coefficients based on the results of the comparison. Coefficient entropy coder 705 entropy encodes the prediction error coefficients and the resulting bit stream, bits 706, is sent to the decoder. The geometric flow used in prediction is sent to the decoder as side information 707.

FIG. 7B is a block diagram of one embodiment of a decoder. In the decoder, the prediction operation is reversed and the quantized wavelet coefficients are reconstructed exactly. The blocks in FIG. 7B are performed by processing logic that may comprise hardware (circuitry, dedicated logic, etc.), software (such as is run on a general purpose computer system or a dedicated machine), or a combination of both.

Referring to FIG. 7B, coefficient entropy decoder 713 performs entropy decoding on bits 712 to generate decoded predicted error coefficients. Inverse prediction unit 714 receives the decoded predicted error coefficient and side information 711, which specifies the geometric flow used during encoding, and generates coefficient values. Inverse quantization unit 705 performs inverse quantization on these quantized coefficient values to produce coefficient values that are not quantized. Inverse wavelet transform unit 716 applies an inverse transform to the inverse quantized coefficient values to produce reconstructed image data 717.

In one embodiment, the codec does not quantize the wavelet coefficients in the beginning and quantizes the prediction error coefficients instead, e.g., by incorporating quantization inside the prediction process in a DPCM fashion.

Figure 8:
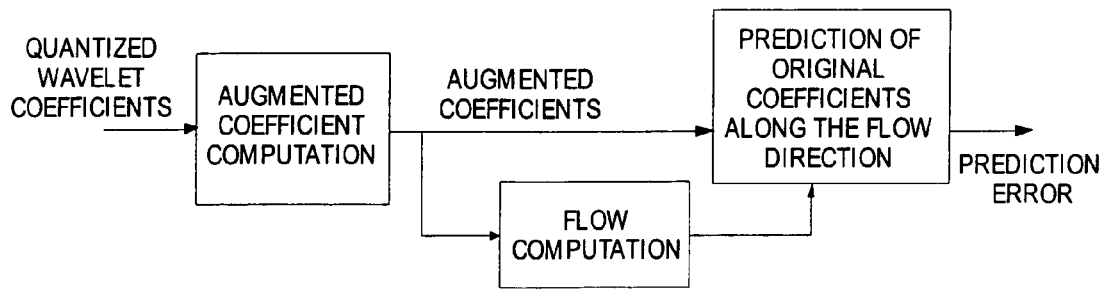
FIG. 8 is a block diagram of one embodiment of a prediction process logic that performs prediction using geometric flow.

In one embodiment, prior to the prediction, a quantization operation is performed so that the original coefficients used by the techniques described herein represent quantized values. In this quantized mode, augmented coefficients are formed in full resolution but based on available quantized original coefficients. FIG. 8 is a block diagram of one embodiment of a prediction process logic that performs prediction using geometric flow. Referring to FIG. 8, augmented coefficient computation unit 802 receives quantized wavelet coefficients 801 and computes augmented coefficients 803 as described above. Flow computation unit 804 receives augmented coefficients and computes the geometric flow. Prediction unit 805 generates a production for each of the original coefficients using augmented coefficients 803 (e.g., a neighborhood of the augmented coefficients around each of the original coefficients as defined in part by the geometric flow of that coefficient) and computed flow from flow computation unit 804.

Figure 10:
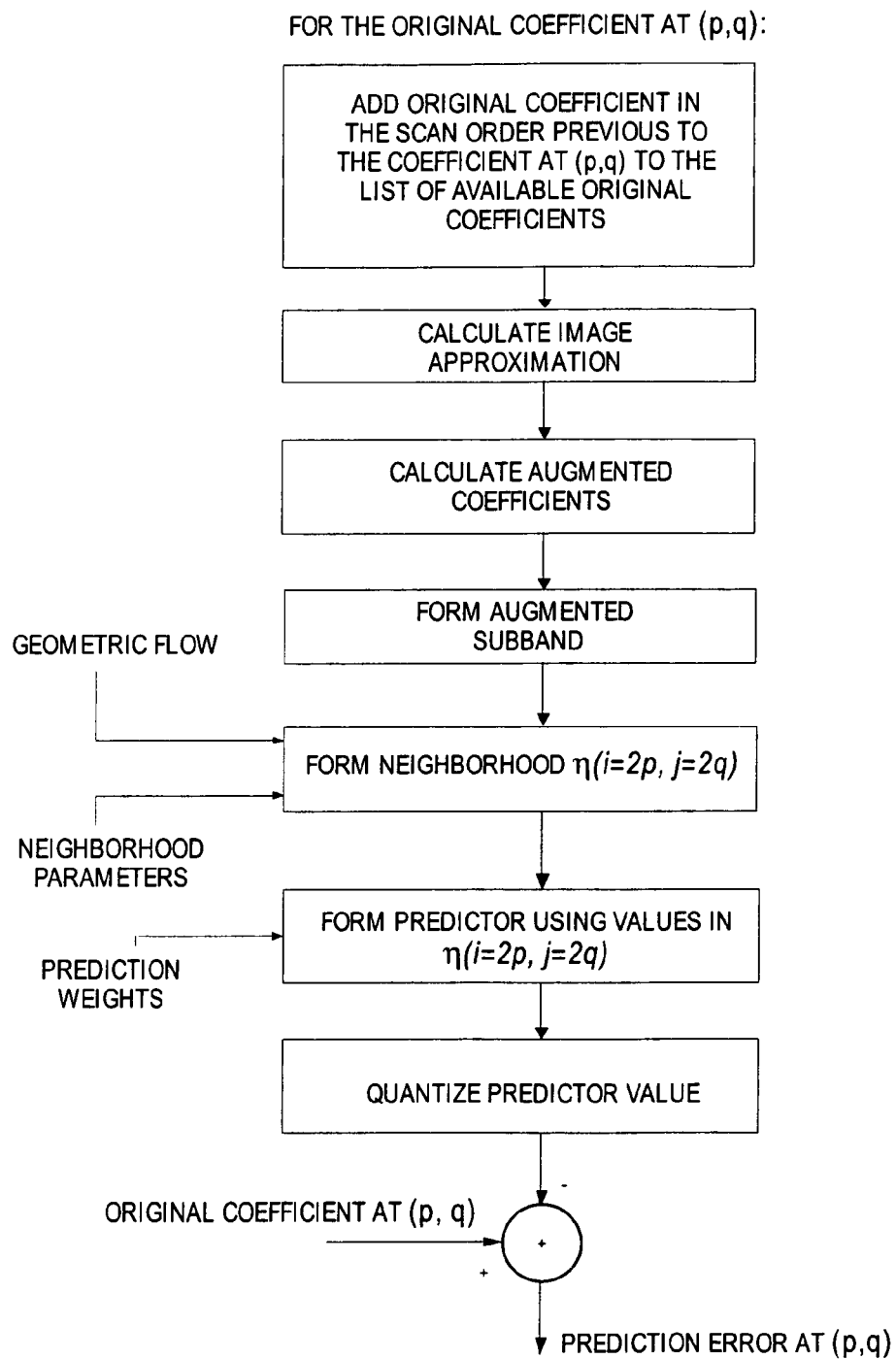
FIG. 10 is a flow diagram of one embodiment of a process for performing prediction based on original coefficients using geometric flow.

In one embodiment, the prediction error is formed by first calculating a full resolution predictor, quantizing this predictor, and subtracting the quantized predictor from the quantized original. FIG. 10 is a flow diagram of one embodiment of a process for performing prediction based on original coefficients using geometric flow. The process is performed by processing logic that may comprise hardware (circuitry, dedicated logic, etc.), software (such as is run on a general purpose computer system or a dedicated machine), or a combination of both.

Referring to FIG. 10, the process begins by processing logic taking the original coefficient at (p,q) and adding it to the list of available original coefficients using the scan order (processing block 1001). Then processing logic computes an image approximation after each addition so that each addition results in a different and finer approximation (processing block 1002). Processing logic uses the image approximation to calculate the augmented coefficients (processing block 1003) and form the augmented subbands (processing block 1004).

After the addition of all coefficients prior to the original coefficient at (p,q), a prediction is made about the original coefficient at augmented band at location (i=2p,j=2q). In one embodiment, this occurs using the following operations. First, processing logic constructs the neighborhood η(i=2p, j=2q) to be used in prediction using the geometric flow and neighborhood parameters that determine how the flow should be interpolated, how values should be interpolated, and the number of steps to be taken for the construction of the neighborhood (processing block 1005). The interpolation could be bilinear interpolation, sinc interpolation, or a more sophisticated interpolation technique. The number of steps could be 1, 2, 5, 10, 20, etc. Next, processing logic combines the prediction weights with the coefficient values obtained from the neighborhood to calculate the predictor value (processing block 1006). Processing logic quantizes the predictor value (processing block 1007) and subtracts the quantized predictor value from the original coefficient at (p,q) to form the prediction error coefficient (processing block 1008).

Hence, in one embodiment, in the quantized mode, the compression encoder can be thought of as taking in quantized original coefficients and outputting quantized prediction error coefficients so that the quantized original coefficients can be recovered exactly using the quantized prediction error coefficients and the calculated flow.

In one embodiment, prior to the prediction operation, a modulation operation of the augmented coefficients used in the prediction is also performed. This modulation shifts the high frequency bands occupied by the augmented coefficients into low frequency bands so that a better prediction may result. For example, the augmented LH band coefficients can be shifted by multiplying every other column by (−1), the augmented HL band coefficients can be shifted by multiplying every other row by (−1), and the augmented HH band coefficients can be shifted by multiplying every other row by (−1) followed by multiplying every other column by (−1).

Once prediction error coefficients for the entire wavelet transform have been calculated, these can be encoded and sent to a decoder using various known techniques. For example coefficient entropy coding techniques based on JPEG 2000 or set partitioning techniques such as described in A. Said and W. A. Pearlman, "A New Fast and Efficient Image Codec Based on Set Partitioning in Hierarchical Trees," IEEEE. Trans. Circ. Syst. Video Tech. 6, pp. 243-250, June 1996 or other methods can be used.

Figure 9A:
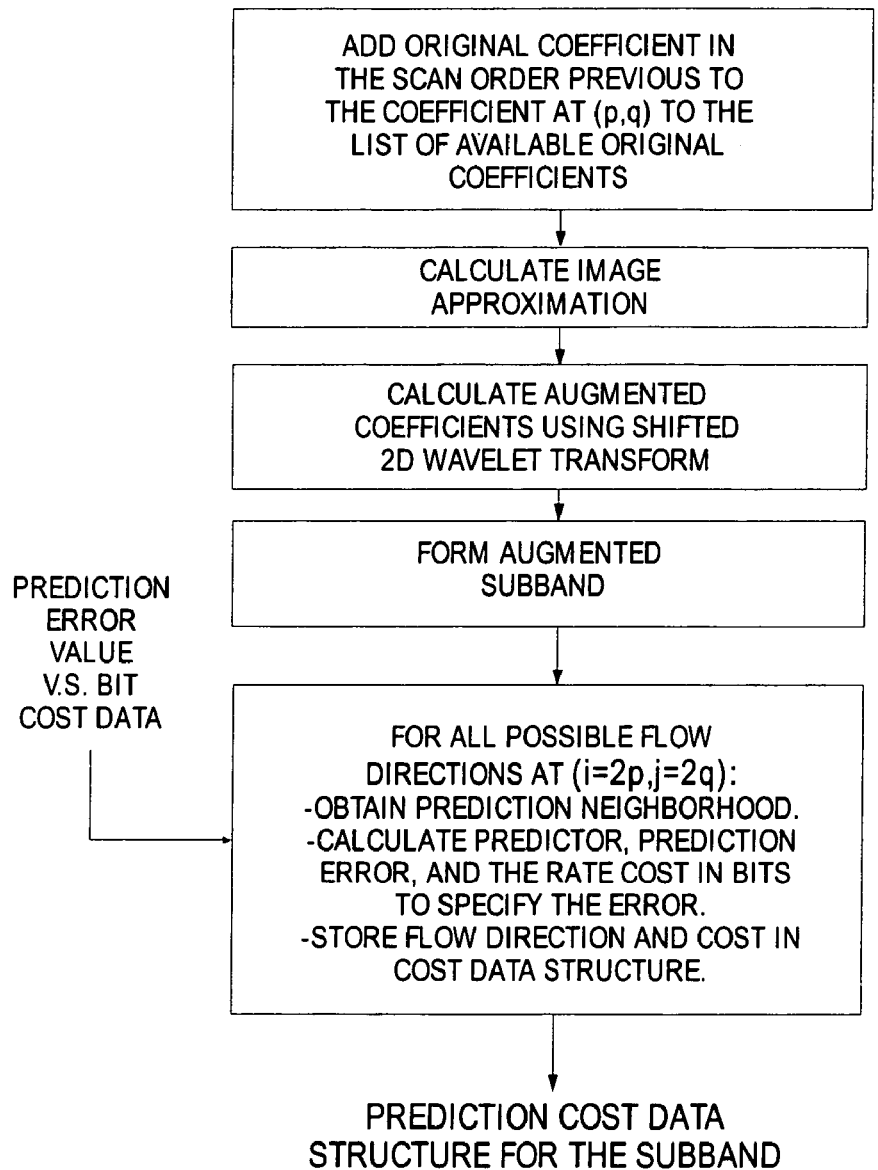
FIG. 9A is a flow diagram of one embodiment of a process for calculating the predication cost data structure.
Figure 9B:
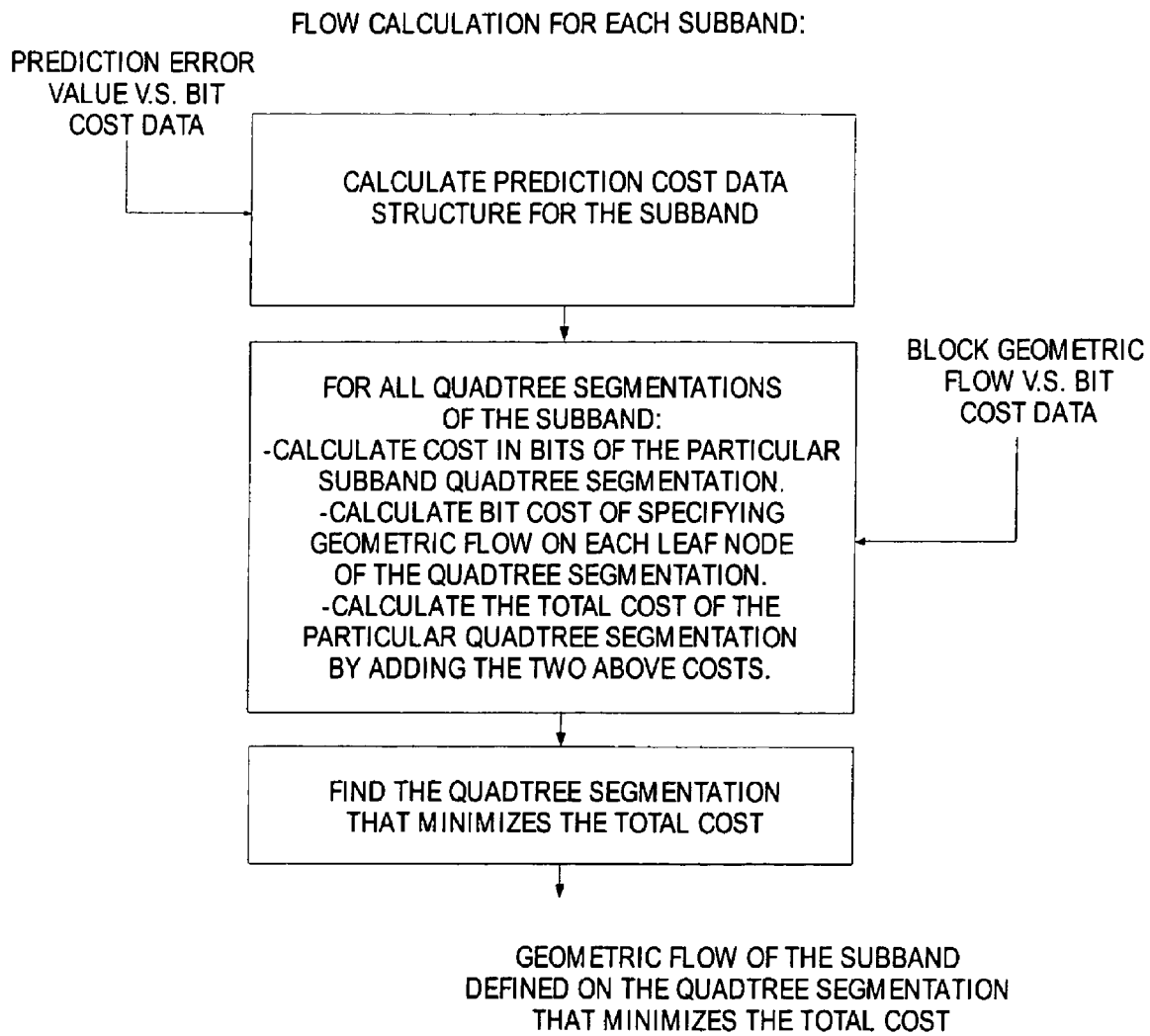
FIG. 9B is a flow diagram of one embodiment of a process for calculation of the optimal flow.

In one embodiment, the flow calculation in each band is done in a way to benefit the application. In one embodiment, in the prediction and subsequent compression application, the flow in each band is calculated to yield the best rate-distortion performance. FIGS. 9A and 9B the geometric flow for a prediction based compression application.

FIG. 9B is a flow diagram of one embodiment of a process for calculation of the optimal flow. The process is performed by processing logic that may comprise hardware (circuitry, dedicated logic, etc.), software (such as is run on a general purpose computer system or a dedicated machine), or a combination of both.

Referring to FIG. 9B, the process begins by processing logic computing a data structure that holds the cost of various prediction possibilities (processing block 911). This data structure is then used in computing the optimal flow. FIG. 9A is a flow diagram of one embodiment of a process for calculating the prediction cost data structure. The process is performed by processing logic that may comprise hardware (circuitry, dedicated logic, etc.), software (such as is run on a general purpose computer system or a dedicated machine), or a combination of both. Referring to FIG. 9A, processing logic adds the original coefficients to the list of available original coefficients using the scan order of each band (processing block 901) and computes an image approximation after each addition (processing block 902). Processing logic uses the image approximation in calculating the augmented coefficients using a shifted 2D wavelet transform (processing block 903) and forming the augmented bands (processing block 904).

After the addition of all coefficients prior to original coefficient at (p,q), at processing block 904, processing logic generates a prediction on the original coefficient at augmented band at location (i=2p,j=2q) using all possible flow directions at (i=2p,j=2q) (i.e. any possible directional angle from the coefficient at that location), computes the prediction error for each flow direction, obtains the bit cost of specifying the error using a table that holds error vs. bit cost data, and stores the flow direction and corresponding cost in the data structure.

Referring back to FIG. 9B, once the prediction cost data structure is computed, flow computation for each band proceeds by processing logic considering all quadtree segmentations of the band. For all quadtree segmentations of the subband, processing logic calculates the cost in bits of the particular subband quadtree segmentation, calculates the bit cost of specifying geometric flow on each leaf node of the quadtree segmentation, and calculates the total cost of the particular quadtree by adding these previous two costs together (processing block 912). In one embodiment, each leaf node of the quadtree corresponds to a segment of one or more original coefficients that have a particular flow. In one embodiment, this particular flow is line-like flow inside the segment. In another embodiment, this flow is a higher order polynomial flow inside the segment. Other flow types may be used. In one embodiment, each particular flow is specified by a parameter. The cost of the quadtree segmentation is the number of bits required to specify the segmentation, the number of bits required to specify the particular flow parameter inside each segment of the segmentation, and the cost in bits of specifying the prediction error associated with the part of flow determined by the segmentation. In one embodiment, the cost of specifying the particular flow parameter inside each segment is determined based on a table that holds bit cost vs. flow parameter information. Processing logic selects the segmentation and segment flow parameters that obtain the minimum cost as the optional flow (processing block 913).

The rate includes the rate needed to specify the flow in each band as well as the prediction errors. Distortion is calculated by inverting the prediction process, forming the original coefficients, inverse wavelet transforming, and calculating the discrepancy of the result with respect to the initial pixel domain image. In one embodiment, the discrepancy is calculated by computing the mean squared error. Other well-known measures may be used.

In one embodiment, the predictors using the pixel values obtained from the neighborhoods $\eta(i,j)$ are obtained by linearly multiplying these values with prediction weights and summing the results. In one embodiment, the prediction weights are obtained in an adaptive fashion for each (i=2p, j=2q) using statistical techniques that calculate optimal weights based on data available at that point. For example, predictors based on autoregressive statistical models, autoregressive moving average statistical models, covariance models, etc., can be employed. Other more sophisticated predictors can also be used such as those disclosed in Onur G. Guleryuz, "Nonlinear Approximation Based Image Recovery Using Adaptive Sparse Reconstructions and Iterated Denoising: Part I—Theory," IEEE Transactions on Image Processing, and Onur G. Guleryuz, "Nonlinear Approximation Based Image Recovery Using Adaptive Sparse Reconstructions and Iterated Denoising: Part II—Adaptive Algorithms," IEEE Transactions on Image Processing.

Alternative Embodiments

In one embodiment, the flow direction $\theta(i,j)$ is one of D different values, where D could be 2, 3, 4, . . . . A reserved NULL direction is used to indicate no-flow, so that original coefficients having no-flow are not predicted and their prediction error is the same as their value. This may be used in the optimization process as a possible flow value with prediction equal to 0.

In one embodiment, the flow inside each quadtree segment is a first order polynomial (line like), a second order polynomial, or a third order polynomial, etc.

In one embodiment, the step size used in neighborhood construction can be 1, 2, 3, . . . or other sequence of real numbers such as, for instance, $\sqrt{2}, 2\sqrt{2}, 3.1\sqrt{2}, \ldots$ or it can be so that with each step a new row or column is reached. The number of steps can be 1, 2, 3, 4, 5, . . . .

In one embodiment, interpolation of directions and pixel values is done by linear interpolation.

In one embodiment, the steerable transforms for a given flow are obtained by constructing a directional covariance matrix where the direction is determined based on the geometric flow, obtaining the eigenvectors of this matrix to construct a directional Karhunen-Loeve transform (KLT), and using the directional KLT as the steerable transform.

In one embodiment, quantization is performed by a dead-zone quantizer. In another embodiment, quantization is not performed.

In one embodiment, wavelet bands are processed from coarse resolutions to finer resolutions. The order of the bands in the coarsest resolution could be LL, LH, HL, HH, or LL, HL, LH, HH, or LL, HH, LH, HL, etc. In another embodiment, in finer resolutions, the order is LH, HL, HH, or HL, LH, HH, etc. Coefficients in each band can be traversed raster scan or flipped raster scan. In one embodiment, LL band is traversed in raster scan, and other bands in a resolution are traversed in tandem raster scan.

An Example of a Computer System

Figure 11:
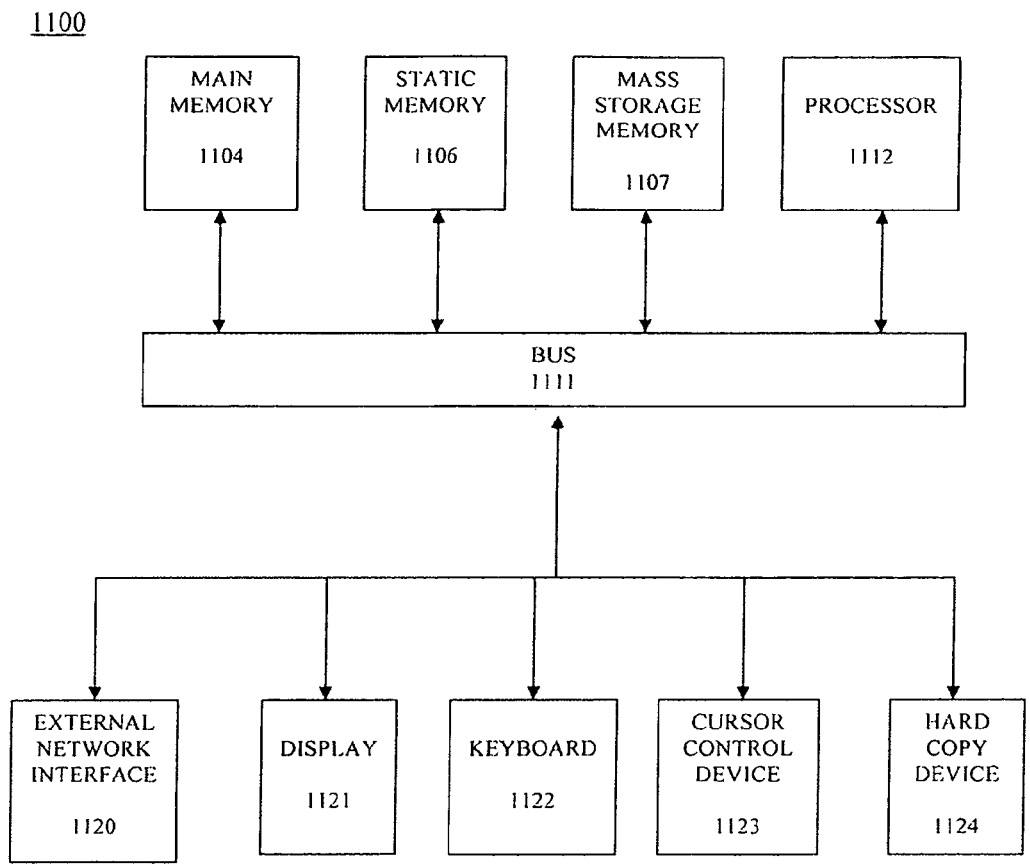
FIG. 11 is a block diagram of an exemplary computer system that may perform one more of the operations described herein.

FIG. 11 is a block diagram of an exemplary computer system that may perform one more of the operations described herein. Referring to FIG. 11, computer system 1100 may comprise an exemplary client or server computer system. Computer system 1100 comprises a communication mechanism or bus 1111 for communicating information, and a processor 1112 coupled with bus 1111 for processing information. Processor 1112 includes a microprocessor, but is not limited to a microprocessor, such as, for example, Pentium™, PowerPC™, Alpha™, etc.

System 1100 further comprises a random access memory (RAM), or other dynamic storage device 1104 (referred to as main memory) coupled to bus 1111 for storing information and instructions to be executed by processor 1112. Main memory 1104 also may be used for storing temporary variables or other intermediate information during execution of instructions by processor 1112.

Computer system 1100 also comprises a read only memory (ROM) and/or other static storage device 1106 coupled to bus 1111 for storing static information and instructions for processor 1112, and a data storage device 1107, such as a magnetic disk or optical disk and its corresponding disk drive. Data storage device 1107 is coupled to bus 1111 for storing information and instructions.

Computer system 1100 may further be coupled to a display device 1121, such as a cathode ray tube (CRT) or liquid crystal display (LCD), coupled to bus 1111 for displaying information to a computer user. An alphanumeric input device 1122, including alphanumeric and other keys, may also be coupled to bus 1111 for communicating information and command selections to processor 1112. An additional user input device is cursor control 1123, such as a mouse, trackball, trackpad, stylus, or cursor direction keys, coupled to bus 1111 for communicating direction information and command selections to processor 1112, and for controlling cursor movement on display 1121.

Another device that may be coupled to bus 1111 is hard copy device 1124, which may be used for marking information on a medium such as paper, film, or similar types of media. Another device that may be coupled to bus 1111 is a wired/wireless communication capability 1125 to communication to a phone or handheld palm device.

Note that any or all of the components of system 1100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   creating, by an encoder of a computing device, a representation for image data that includes determining a geometric flow for image data, wherein the geometric flow is obtained by:
   calculating an augmented set of pixel values for the image data; and
   determining a direction angle for each pixel value in the image data in the augmented set; and
   performing, by the encoder, an image processing operation on data in the representation using the geometric flow including performing prediction in a transform domain using the augmented set of pixel values.

2. The method defined in claim 1 wherein the geometric flow includes a flow direction for each datum in the image data.

3. The method defined in claim 1 further comprising:
   scanning original pixel values in the image data in a first order;
   adding scanned pixels to a set of available pixels.

4. The method defined in claim 3 further comprising performing one or more image operations in sequence to a set of available coefficients.

5. A method comprising:
   creating, by an encoder of a computing device, a representation for image data that includes determining a geometric flow for image data, the creating comprising:
   determining a plurality of neighborhoods for the plurality of pixels in the image data, wherein each neighborhood in the plurality of neighborhoods is associated with one pixel of the plurality of pixels in the image data;
   generating a plurality of predictions for the plurality of pixels, the plurality of predictions for each of the plurality of pixels based on pixel values in its associated neighborhood;
   determining a prediction error for each prediction in the plurality of predictions; and
   compressing prediction errors; and
   performing, by the encoder, an image processing operation on data in the representation using the geometric flow.

6. The method defined in claim 5 wherein determining the plurality of neighborhoods comprises determining at least one of the neighborhoods based on a direction angle and an augmented set of pixel values for the image.

7. The method defined in claim 1 wherein the geometric flow is computed based on a rate-distortion optimization criterion.

8. The method defined in claim 1 wherein the geometric flow is defined on a quadtree segmentation.

9. The method defined in claim 1 wherein the geometric flow is a piecewise polynomial.

10. The method defined in claim 1 wherein the geometric flow is piecewise smooth with point-like singularities.

11. The method defined in claim 1 wherein the image processing operation comprises one or more selected from a group consisting of: a compression operation, a denoising operation, and a transformation operation.

12. The method defined in claim 1 further comprising transforming image data using the geometric flow.

13. The method defined in claim 1 further comprising denoising image data using the geometric flow.

14. The method defined in claim 1 further comprising compressing image data using the geometric flow.

15. A method comprising
   creating, by an encoder of a computing device, a representation for image data that includes determining a geometric flow for image data;
   performing, by the encoder, an image processing operation on data in the representation using the geometric flow; and
   defining, by the encoder, a linear, invertible, steerable transform over regions of pixels in the image data using directional statistical covariance matrix models obtained using the flow.

16. An article of manufacture having one or more non-transitory computer readable storage media storing instructions which, when executed by a system, cause the system to perform a method comprising:
   creating, by an encoder of a computing device, a representation for image data that includes determining a geometric flow for image data, wherein the geometric flow is obtained by:
   calculating an augmented set of pixel values for the image data; and
   determining a direction angle for each pixel value in the image data in the augmented set; and
   performing, by the encoder, an image processing operation on data in the representation using the geometric flow including performing prediction in a transform domain using the augmented set of pixel values.

17. The article of manufacture defined in claim 16 wherein the geometric flow includes a flow direction for each datum in the image data.

18. The article of manufacture defined in claim 16 wherein the instructions, when executed by the system, cause the system to perform operations further comprising:
   scanning original pixel values in the image data in a first order;
   adding scanned pixels to a set of available pixels.

19. The article of manufacture defined in claim 16 wherein the instructions, when executed by the system, cause the system to perform operations further comprising performing one or more image operations in sequence to a set of available coefficients.

20. The article of manufacture defined in claim 16 wherein the geometric flow is computed based on a rate-distortion optimization criterion.

* * * * *